July 6, 1965  C. H. T. WOODWARD  3,192,960
APPARATUS FOR AND THE PROCESS OF MAKING AND
ATTACHING BAILS TO EARLESS CONTAINERS
Filed Sept. 27, 1962  8 Sheets-Sheet 1

INVENTOR.

INVENTOR.

Cyril Horace Woodward

July 6, 1965  C. H. T. WOODWARD  3,192,960
APPARATUS FOR AND THE PROCESS OF MAKING AND
ATTACHING BAILS TO EARLESS CONTAINERS
Filed Sept. 27, 1962  8 Sheets-Sheet 3

INVENTOR.

July 6, 1965                    C. H. T. WOODWARD                    3,192,960
          APPARATUS FOR AND THE PROCESS OF MAKING AND
                ATTACHING BAILS TO EARLESS CONTAINERS
Filed Sept. 27, 1962                                    8 Sheets-Sheet 4

INVENTOR.

July 6, 1965 C. H. T. WOODWARD 3,192,960
APPARATUS FOR AND THE PROCESS OF MAKING AND
ATTACHING BAILS TO EARLESS CONTAINERS
Filed Sept. 27, 1962 8 Sheets-Sheet 5

INVENTOR.

INVENTOR.

united States Patent Office 3,192,960
Patented July 6, 1965

3,192,960
APPARATUS FOR AND THE PROCESS OF MAKING AND ATTACHING BAILS TO EARLESS CONTAINERS
Cyril H. T. Woodward, 160 Howard Ave., Rochelle Park, N.J.
Filed Sept. 27, 1962, Ser. No. 226,073
20 Claims. (Cl. 140—75)

This invention relates to apparatus for the process of making and attaching bails to earless containers.

More particularly this invention applies to the apparatus and process for forming and inserting bail handles into a top receiving means on containers without ears.

The configuration, use and application of said bail handles to earless containers is disclosed in my co-pending patent application Serial No. 191,788, filed May 2, 1962. A preferred embodiment as well as certain other exemplifications are shown and described which disclose the product generally as contemplated.

Since the use of eared containers and bails has been commonplace for more than half a century, and as in the last several years the production and use of eared and bailed one-gallon cans has been in the several millions; the efforts to satisfactorily produce this large quantity has resulted in many designs of bails, ears, containers and the attendant apparatus for their manufacture and installation. The formation of ears and their attachment to the containers requires both labor and material to a substantial degree. A certain percentage of improperly attached ears makes the use of an eared bailed container fraught with unpleasant consequences when the ear releases from the container as it is being carried or hung by the bail. Other disadvantages of an eared container are found in packing, storage and applying of labels.

All of the advantages and benefits attendant to the production of a bailed container without ears are not listed below but among several important advantages are the following:

An earless container is more economical to make in that the material and labor for producing and attaching the ear is eliminated. The apparatus for this production is also not needed. As mentioned above the scrap loss found with incompletely attached ears is also eliminated.

The space requirements for packaging, storing and shipping is less in an earless container of the type described. It is also to be noted that labeling is much simpler when the presence of ears is eliminated.

In a high volume industry where costs are figured in fractions of a cent per unit the cost of a bailed earless container provides a definite economic advantage.

The reasons that have made bails desirable on containers are still valid reasons for having bails on earless containers.

To produce these bailed containers the apparatus for and process of making a bail and applying the bail to the container should be economical to make and use. The bail produced should also require less material to make a bail than the bail for eared containers.

In the present invention the problems of manufacture of a container with ears is eliminated. The apparatus necessary to make and insert a bail into the ears of an eared container is eliminated in favor of the simplified higher speed apparatus of my invention. A novel wire measuring and cutting system allows the wire to be fed from a storage source into a wire straightener thence into a revolving roller. The roller length provides the precise wire length desired and also a plurality of passageways for the wire to pass across. The rotary motion of the roller is correlated with the speed of the wire so as to have a length of wire pass across the passageway before being cut. After cutting, the wire is deposited in a chute and allowed to accumulate for future forming operations until the chute is full at which time a cut off switch stops the wire feeding until the supply in the chute has become depleted whence the wire is once again fed and cut.

From the wire chute the wire is transferred to a turret drum having a multiplicity of wire holding grooves and clamps. In successive operations the ends of the wire is bent, shaped and/or swaged to form the desired protuberances on the end of the wire. After the ends of the bail have been shaped the bail is then transferred to bending dies where the U-form is made. At this point it is sometimes desirable to accumulate the formed bails for later insertion. This is particularly true when the insertion station is installed as part of a high speed conveyor sometimes reaching nearly two hundred containers a minute.

From a delivery feeder or from the forming dies the bail is brought down to the container and the ends are turned in the receiving groove and the bail, now inserted, is released.

The conveyor is equipped with a simple and inexpensive container feeding means. A stop interrupts the flow on the conveyor chains and side grips align the container under the inserting mechanism. If no container is under the inserting mechanism the insertion does not take place. A simple stop arrangement in cooperation with the side grips holds the bail in a position just above the following container.

It is therefore an object of the present invention to provide an automatically operated, economical, flexible and simplified bail making and inserting apparatus.

It is also an object of this invention to provide a means and method of making and inserting a bail for earless cans; the bail for the earless can requiring less material than a bail for an eared can.

It is contemplated that this invention will provide economies of material and apparatus and will provide a bailed container easier to pack, stack, ship and label than a correspondingly eared can. It is further intended to provide apparatus that will permit high operating speeds.

It is an object of this invention to provide apparatus that will permit the seperation of the bail making and the bail inserting stations. It is intended that one advantage of such separation would be the storage of pre-formed bails in large quantities with the subsequent insertion of these bails to containers with appropriate apparatus used on a high speed conveyor or filling line.

It is a further object to provide apparatus and a process for inserting a formed bail of any material when the bail has appropriate protuberances for engaging the receiving means in the top of the earless container as shown in my co-pending application mentioned above.

It is further contemplated to provide new and novel means for the measuring and precision cutting of wire to a predetermined length.

It is also an object of my invention to provide new and novel end forming and transferring apparatus and a new process of forming such ends and transferring such wire.

It is a further object to provide a simple, economical, automatically operated apparatus in a conveyor system for synchronizing and adjusting the movement of containers with respect to bail applying mechanism positioned along the conveying route.

With the foregoing objects, features and advantages in view together with others which will appear as the description proceeds, it will be noted that the invention comprises certain novel features of construction, arrangement and structure hereinafter more fully described, illustrated in the accompanying drawings, and particularly pointed out in the appended claims and that various changes in the form, proportion, size and minor details of the described construction, arrangement and structure may be made without departing from the spirit or sacrificing any of the advantages of the invention.

For the purpose of facilitating an understanding of this invention, there is illustrated in the accompanying drawings a preferred embodiment, from an inspection of which, when considered in connection with the following description, this invention, its mode of construction, assembly and operation, and many of its advantages should be readily understood and appreciated.

Referring to the drawings in which the same characters or references are employed to indicate corresponding or similar parts throughout the several figures of the drawings.

Figure 1:
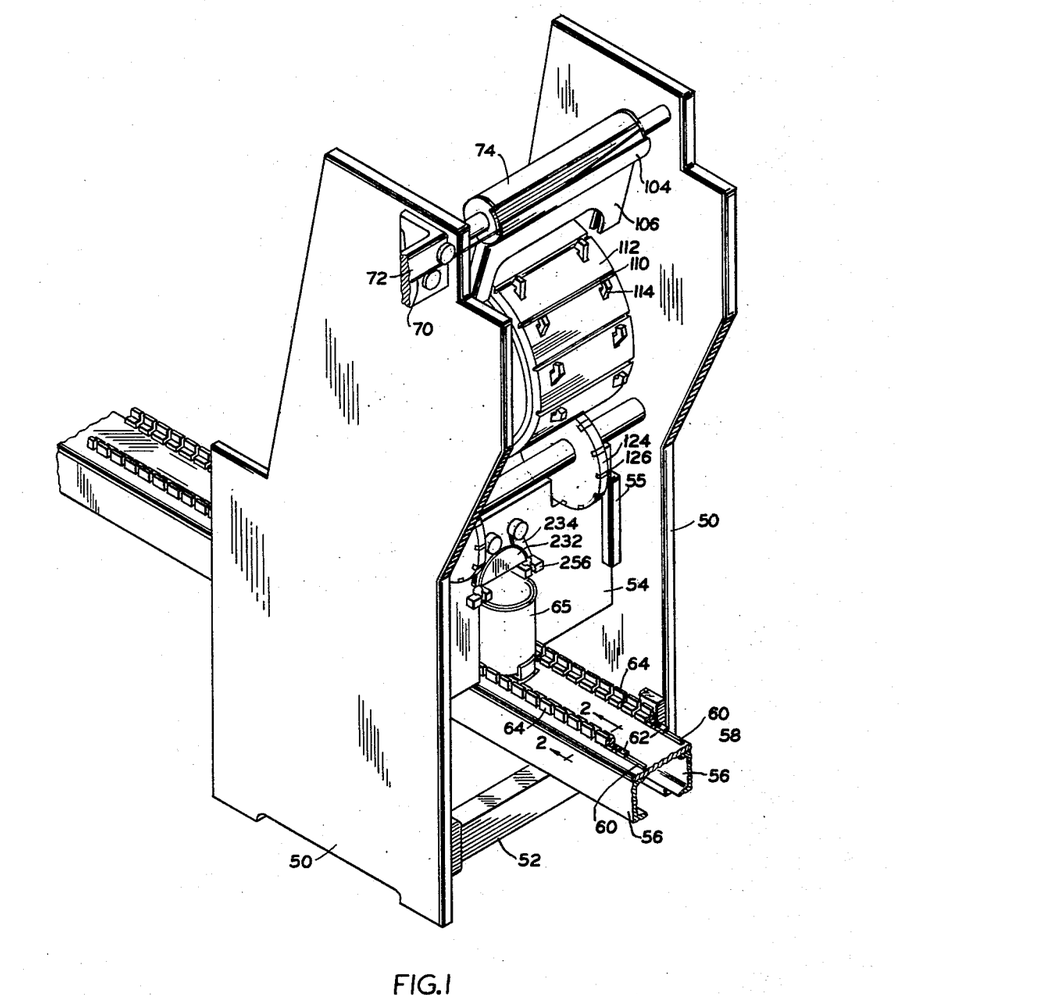
FIGURE 1 is a simplified isometric view of the assembled machine showing the general arrangement of many major components.
Figure 2:
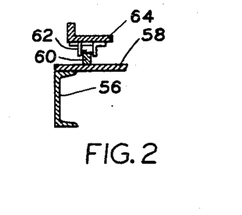
FIG. 2 is a sectional view of the conveyor taken on the line 2—2 of FIG. 1.
Figure 30:
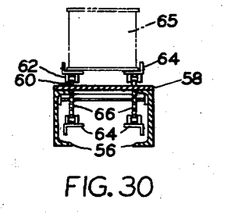
FIG. 30 is a sectional view taken on the line 30—30 of FIG. 28.

The preferred embodiment of my invention in which all required operations are combined within one framework is shown in FIGS. 1 and 2. Two side frames 50 are held in spaced relationship by a bottom support 52 and a main plate 54 movable vertically in guides 55. Upon bottom support 52 are fastened two channel members 56 which act as the support of the conveying system. Attached to the channel members 56 is a top plate 58 upon which are fastened in a predetermined spaced relationship a pair of slide guides 60. The side guides 60 are so arranged and constructed as to enable a pair of roller chains 62 with attached angle clips 64 attached thereto to be drawn through the apparatus so that a container 65 may be moved at a predetermined speed and relationship. As shown in FIG. 30, and located under top plate 58, chains 62 with clips 64 are shown being returned within channel members 56. A pair of sprockets 66 mounted on a shaft 68 rotatable in bearings 69 is used to drive feeding and spacing mechanism to be hereinafter described. As contemplated both chains 62 travel at the same speed.

The apparatus necessary to take a wire 70 from a given supply (not shown) and bend and form it into the desired bail is located in the upper part of the frame work. The wire 70 is drawn from a storage supply and is passed through a powered wire straightener 72 of conventional design and use which is attached to the frame 50. By regulating the feeding speed of the straightener 72 a selected amount of wire 70 is thus presented for the subsequent operations.

Figures 3, 4, 5, 6, 7, 8, 9, 10:
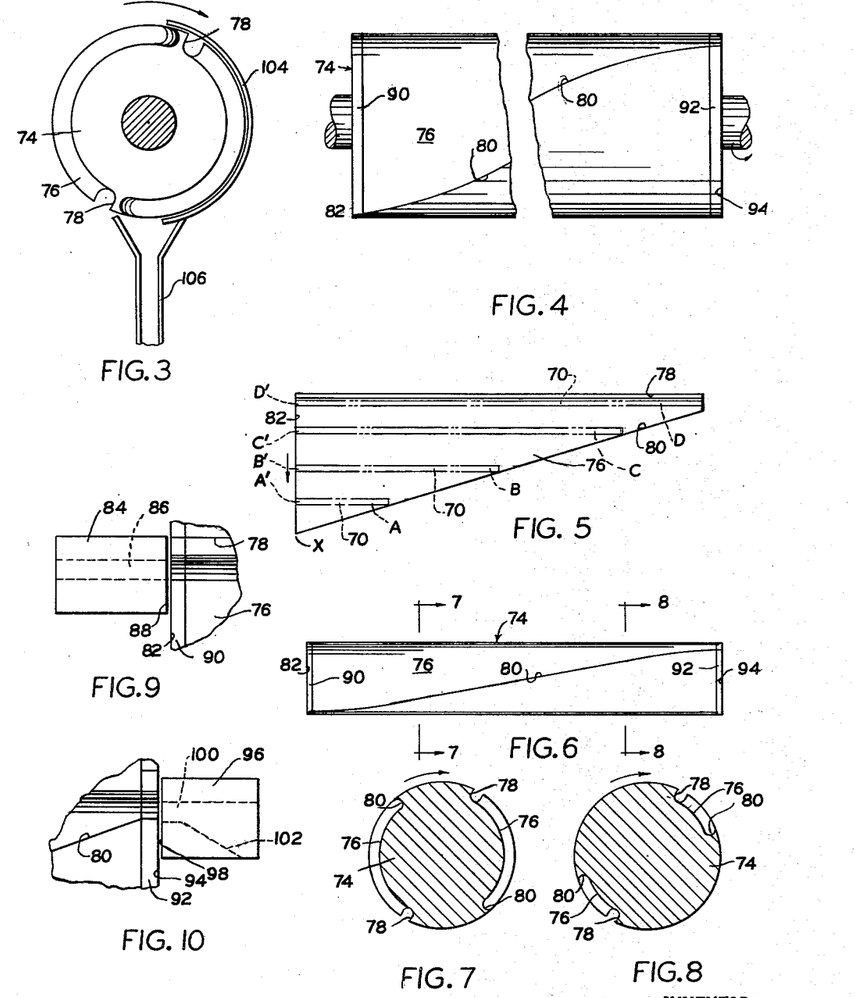
FIG. 3 is an end view of the wire measuring roller and discharge chute showing the discharge chute in section.
FIG. 4 is a partial side view of the wire measuring roller.
FIG. 5 is a development of the wire receiving recess in the measuring roller.
FIG. 6 is a side view of the wire measuring roller.
FIG. 7 is a sectional view taken on the line 7—7 of FIG. 6.
FIG. 8 is a sectional view taken on the line 8—8 of FIG. 6.
FIG. 9 is a partial side view showing the inlet guide die block.
FIG. 10 is a partial side view showing the outlet cutting die block.

The new and novel precision wire cut off apparatus is shown in FIGS. 3, 4, 5, 6, 7, 8, 9 and 10, wherein a measuring roller 74 has a recess 76 formed on the peripheral surface. The recess is only as deep as the wire 70 is thick. One side of the recess 76 defines a straight shoulder 78 across the roller 74, the shoulder 78 being parallel with the axis of roller 74. The opposite side of the recess 76 is defined by a slanted edge 80 moving from a point about 165 degrees from shoulder 78, on the left side as shown in FIG. 4, to a point approximately ten degrees from shoulder 78 on the right side as shown in FIG. 4. In the present instance two recesses 76, diametrically opposite each other, are provided in the roller 74 thus enabling two lengths of wire 70 to be measured and cut as the roller 74 makes one complete revolution. As shown in diagrammatic fashion in FIG. 5 in which recess 76 is shown in a flat plane, wire 70 advances into recess 76 as roller 74 is revolving. At position A the wire 70 has been fed in about one quarter of the distance from inlet side 82 and in traversing this distance roller 74 has moxed from starting point X to A'. As the wire 70 proceeds into the recess 76, the roller 74 continues to rotate enabling the lead end of wire 70 to contact or be adjacent to the slant edge 80. At position B the wire will have traversed approximately one half of the recess 76 and will be located at B' in respect to starting position X. At C the wire will be approximately three-quarters across the recess 76 and at C' in respect to position X. At position D the wire will have moved across the roller and will lie adjacent to the shoulder 78, and at D' from point X.

To effect a cut off of the wire, cutting dies are necessary. In the present instance a guide die block 84 retains the wire 70 and also acts as a support for the wire. As shown in FIG. 9 a passageway 86 is made in block 84 which in the present instance is made of hardened tool steel. The block 84 is positioned near roller 74 so that exit edge 88 is, in the preferred instance, about fifteen-thousandths of an inch from inlet side 82. The inlet side of roller 74 has a hardened cutting plate 90 attached to and made a part of roller 74. In use it has been found satisfactory to make plate 90 about one-quarter of an inch thick and of hardened tool steel.

The opposite side of the roller 74 being also intended to act as a cutting element has a similarly attached cutting plate 92 also of hardened tool steel of about the same thickness (FIG. 10). A back edge 94 is also about fifteen-thousandths of an inch from a cutting die block 96 having a facing edge 98 and a passageway 100. To assure that wire 70 when cut into a bail length is cut on both ends, it is necessary that a small surplus of wire be used. Accordingly when the wire is cut small pieces of wire, usually about one-eighth to one-quarter inch long, remain in die 96 and lay in passageway 100. To dispose of these small pieces of wire a sloped discharge chute 102 is formed as a continuation of the passageway 100.

To retain the wire in recess 76 and to provide a guideway after the wire is cut a cover 104 is curved and fitted to lie adjacent to the roller 74. In the present exemplification the cover 104 has been placed about twenty- to thirty-thousandths of an inch from the roller. At the termination of the cover a chute 106 is formed and attached. This chute acts to provide a guideway for a cut wire 108 to drop into and pass in a controlled manner to subsequent operations. Both cover 104 and chute 106 are attached to the side frames 50 in a rigid prepositioned manner.

Although considerable latitude is possible in the location of the die blocks 84 and 96, it is desirable that the passageways for the wire be in line. In the present instance the preferred location of the die blocks is near the upper part of cover 104 as shown in FIG. 3.

Figure 11:
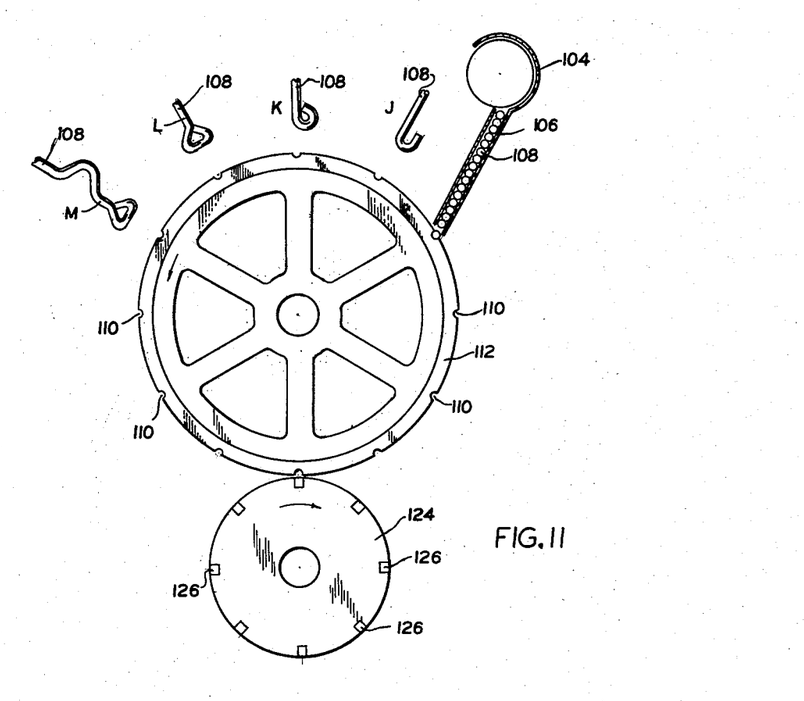
FIG. 11 is a side view showing the turret, drum and the magnetic transfer roller.
Figure 12:
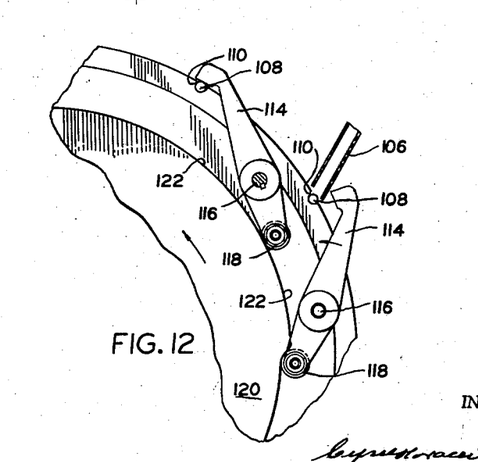
FIG. 12 is a fragmentary side view showing the wire gripping mechanism.

After cutting to a predetermined length, the cut wire now designated 108 is fed into chute 106 to be fed to forming operations to be hereinafter described. In FIGS. 11 and 12 the apparatus for forming the ends of the wire is shown. The cut wire 108 lies in chute 106 which is located in such a manner that only one wire 108 is able to be fed into a receiving groove 110, a multiplicity of which is disposed equally around the periphery of a turret drum 112. The drum 112 is intermittently rotated or indexed and while at certain stop positions the ends of wire 108 are formed as well as crimps adjacent to the ends formed in the wire. Representative actions on the wire 108 are shown above turret drum 112 in FIG. 11. At position J, in the present instance, the end of wire 108 is bent back upon itself. At position K the wire 108 is completed into a loop. At position L the loop is flattened on the end into an elliptical form. At position M the wire 108 has a crimp formed adjacent to the end. Other end formations are possible and in certain instances are desirable, however the formation of the dies determine the final confiburation formed in the end of the wire.

To hold wire 108 in groove 110 a finger 114 is mounted on stud 116. A roller 118 is mounted on one end of finger 114. Roller 118 contatcs and rolls on a cam surface 120 whereupon the finger 114 is spaced away from wire 108. When the roller 118 engages the rise portion 122 of the cam surface 120 the finger 114 moves toward drum 112 and grips the wire 108 holding it in groove 110. To ensure that finger 114 will open when desired stud 116 is spring biased open (spring not shown) and stud 116 is rotatable in a bearing support (not shown). In the present instance a transfer roller 124 is mounted at a position directly under turret drum 112 (as shown in FIG. 11). The transfer roller 124 is geared with drum 112 in such a manner that when a magnetic segment 126 coincides with a groove 110 the finger 114 will release allowing wire 108, now with ends formed, to move to and be held on magnetic segment 126.

Figure 13:
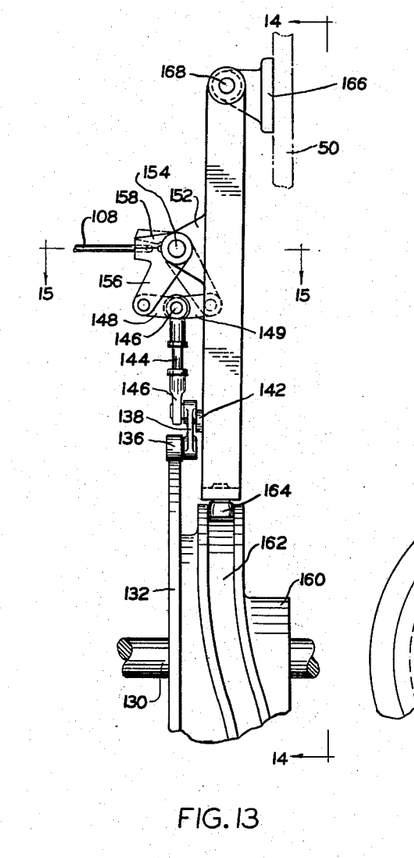
FIG. 13 is an enlarged partial side view showing the wire end forming apparatus.
Figure 14:
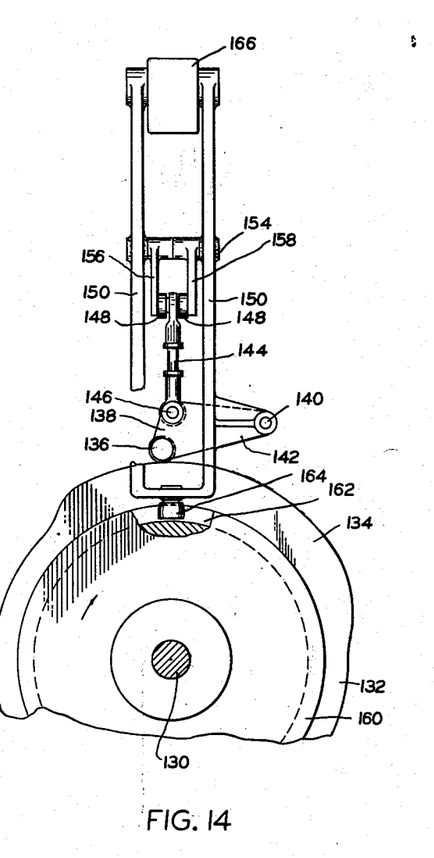
FIG. 14 is a side view of the apparatus shown in FIG. 13.
Figure 15:
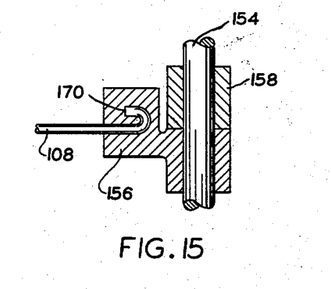
FIG. 15 is a sectional view taken on the line 15—15 of FIG. 13.

A preferred method of shaping the ends of the wire is shown in FIGS. 13, 14 and 15. As wire 108 is held in groove 110 by finger 114 as above described, end forming apparatus is being activated. Upon a shaft 130 is mounted a cam 132 having a rise portion 134. Contacting cam 132 is a cam follower 136 mounted on an arm 138. Arm 138 is pivotally mounted on a pin 140 attached to bracket 142. An adjustable link arm 144 is attached by a pin 146 to arm 138. The other end of link arm 144 has a pin 146 extending therefrom. Two toggle links 148 and 149 are mounted on and are rotatable on pin 146. Swing frame 150 has support extensions 152 extending therefrom. A link pin 154 is supported by extension 152. On link pin 154 is mounted a lower die 156, one arm of which is connected to toggle link 148. Also mounted on pin 154 is upper die 158 one arm of which is connected to toggle link 149.

Also mounted on shaft 130 is a barrel cam 160. Formed in cam 160 is a cam track 162 within which a cam follower 164 is caused to move. The cam follower 164 is attached to the end of swing frame 150 while the other end of the frame is pivotally mounted on a bracket 166 by means of a pin 168. Bracket 166 is mounted on side frame 50.

In operation, as shaft 130 rotates, the cam 132 with lobe 134 causes follower 136 to raise upward in turn causing link arm 144 to move upward. Upward movement of link arm 144 causes links 148 and 149 to move toward a horizontal position as shown in FIG. 13. This movement causes the dies 156 and 158 to close upon wire 108. Meanwhile cam follower 164 is moving in track 162 of cam 160. In the position as shown the follower 164 is moved toward cam 132 which causes a corresponding side movement in swing frame 150. As frame 150 moves left the ends of wire 108 are caused to be formed in the dies. As shown in FIG. 15 the dies 156 and 158 have a groove formation 170 formed in each die. To release the wire 108 with the ends formed it is necessary that dies 156 and 158 open before returning to their start position. Accordingly, cam lobe 134 moves past follower 136 allowing arm 144 to move downward whence dies 156 and 158 are opened. When the formed end of the wire 108 is released then the track 162 moves the swing frame 150 away from cam 132.

Subsequent operations to the end forming above are often required to bring the end of the wire to the desired conformation. Mechanism and methods used in the present instance are shown in FIGS. 16, 17, 18 and 19. The wire 108 having the end shaped as in FIG. 15 necessarily requires that the apparatus open and close over the turned end. A pair of dies 172 and 173 are mounted on shafts 174 and 175. Also mounted on shafts 174 and 175 are a pair of meshed gears 176 and 177 so arranged as to cause the dies 172 and 173 to move toward or away from each other. Rotation to shaft 174 is imparted by a lever arm 178 also mounted on shaft 174. The other end of arm 178 has a pin 180 mounted thereon, the axis of the pin 180 being parallel to the axis of shaft 174. Also mounted on pin 180 is a rod end 182 attached to a rod 184. The other end of rod 184 also has a rod end 186 attached thereon. A lever 188 is pivotally mounted on a shaft 190 the other end of the lever 188 having a stud 192 extending at right angles and engaging rod end 186. Intermediate of the lever 188 is mounted a cam follower 194. A cam 196 is mounted on shaft 130 and the cam 196 has formed therein a cam track 198 which track causes cam follower 194 to rise and fall. A corresponding movement is imparted to the end of lever 188 causing rod 184 to move up and down affecting the opening and closing of dies 172 and 173 as shown in solid and phantom outline in FIG. 16.

Figure 16:
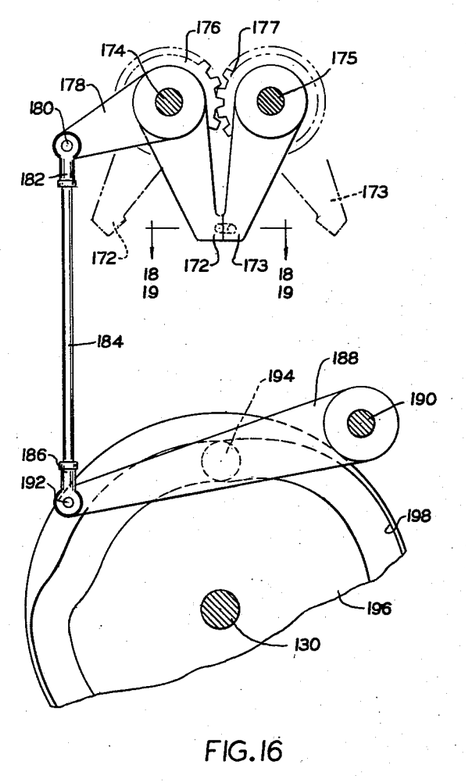
FIG. 16 is an end view of other wire end forming apparatus.
Figure 17:
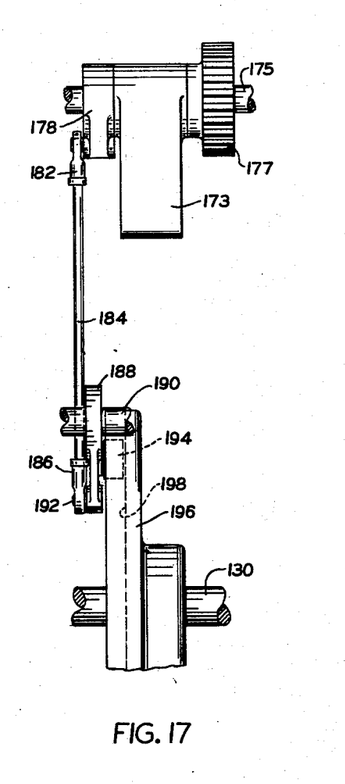
FIG. 17 is a side view of the apparatus shown in FIG. 16.
Figure 18:
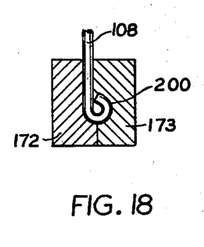
FIG. 18 is a sectional view taken on the line 18—18 of FIG. 16.

Within dies 172 and 173 is formed a shaping cavity 200 which in the present instance causes the wire end to form a loop.

Figure 19:
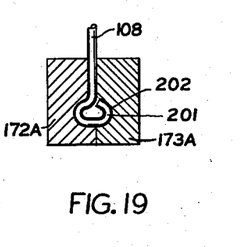
FIG. 19 is a sectional view taken on the line 19—19 of FIG. 16.

Identical apparatus and motions are required and used in the preferred instance when it is desired to shape the end of wire 108 into an elliptical shape 201. As shown in FIG. 19 dies 172A and 173A are identical to dies 172 and 173 except that cavity 202 is elliptically shaped.

Similar apparatus is used for intermediate dies when shape variations are desired, the cavity being formed to produce the wire shaping desired.

After the ends of wire 108 are shaped as desired, the groove 110 deposits the wire onto magnetic segments 126 as explained above (FIG. 11). The wire is transferred to the main plate 54 where it is bent into a U-shape.

Figure 20:
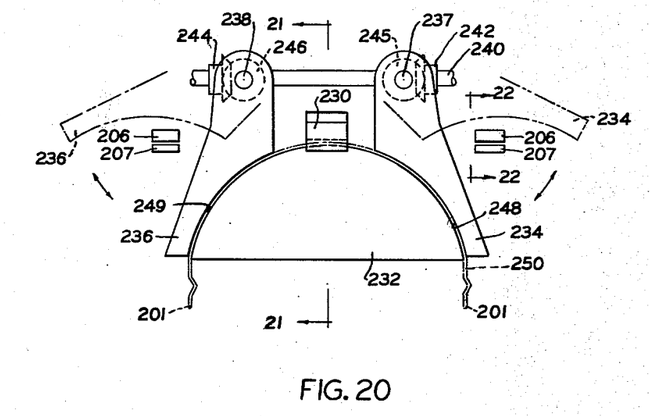
FIG. 20 is a front view of the U-forming mechanism.
Figure 21:
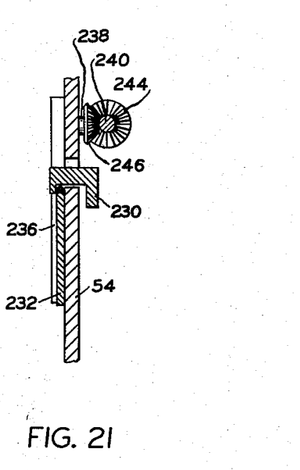
FIG. 21 is a sectional view taken on the line 21—21 of FIG. 20.
Figure 22:
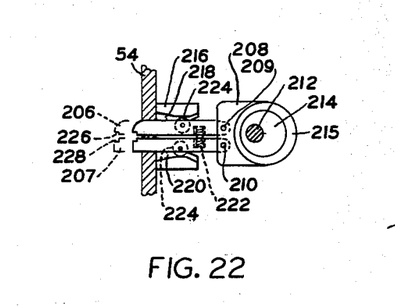
FIG. 22 is a sectional view taken on the line 22—22 of FIG. 20.

A preferred method and apparatus is shown in FIGS. 20, 21 and 22 in which two pairs of grippers are adapted to grasp and transfer the wire 108. Gripper apparatus as shown in FIG. 22 include an upper finger 206 and a lower finger 207, both fingers being pivotally mounted at one end in an eccentric block 208. Pins 209 and 210 retain the fingers 206 and 207 in the block 208. Shaft 212 has mounted thereon eccentric body 214 riding in bearing 215. A cam block 216 has an upper cam track 218 and a lower cam track 220 formed therein. At the back of the block 216, the tracks 218 and 220 slope outwardly. A spring 222 urges the fingers 206 and 207 apart. A roller 224 is mounted in upper finger 206 and a like roller 224 is mounted in lower finger 207. Rollers 224 contact and roll on tracks 218 and 220. In the front of upper finger 206 is a partial wire groove 226 and similarly, a partial wire groove 228 is formed in lower finger 207. In operation the eccentric 214 is rotated so that the fingers 206 and 207 are brought to the maximum position forward of plate 50. The wire 108 is then grasped as rollers 224 move in tracks 218 and 220 as the eccentric body 214 rotates causing fingers 206 and 207 to move away from plate 54. When the fingers 206 and 207 have moved the wire 108 to plate 54 the rollers 224 move outwardly on the tracks 218 and 220. In the meantime a clamp block 230 moves downward to grip the wire 108 against a lower die form 232. To form the wire 108 into a U-form against die form 232, the preferred method shown has a right upper die form 234 and a left upper die form 236 attached to shafts 237 and 238. The shafts 237 and 238 are retained in bushings in plate 54 and are rotatable therein. A shaft 240 is spaced away from plate 54 and has affixed to it a bevel gear 242 and an oppositely faced bevel gear 244. A mating bevel gear 245 is attached to shaft 237 and engages with minimum backlash bevel gear 242. Also a bevel gear 246 is attached to shaft 238 and engages gear 244 with a minimum backlash. To operate, after wire 108 is in place and grasped between block 230 and die form 232, the die forms 234 and 236 are caused to move from open to closed position. In FIG. 20 the open position is shown in phantom outline and the closed position in solid outline. The die forms 234 and 236 have a curved underside 248 and 249 arranged to press wire 108 firmly against die form 232 whence the cut wire 108 is bent into a U-form becoming a bail 250.

As the shaft 240 is rotated, gears 242 and 244 also rotate and being meshed with gears 245 and 246 also cause them to rotate. The rotation of the gears 245 and 246 causes a corresponding rotation in shafts 237 and 238 and likewise in upper die forms 234 and 236.

Figure 23:
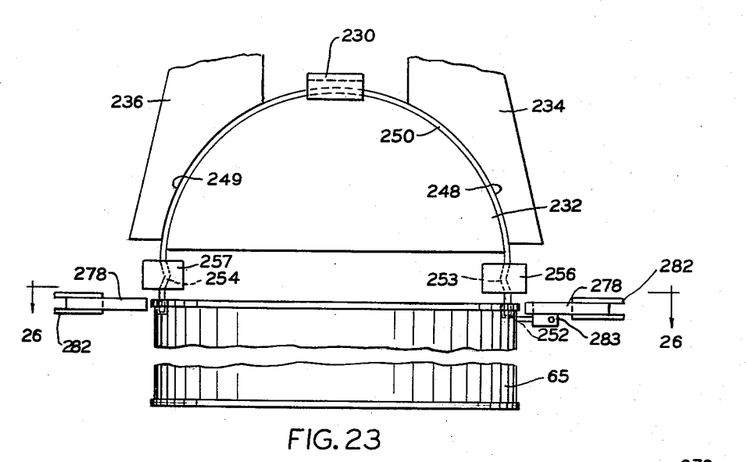
FIG. 23 is a front view showing the U-form completed and at an early stage of insertion into the container.

To insert the bail 250 into the container 65 two motions are required; firstly, a movement of the bail downward toward the container and a second motion which is the turning of the ends of the bail 250 in a receiving groove 252 in container 65. The downward movement of the bail 250 is performed in the present instance by moving main plate 54 downward in guides 55. It has been found that a movement of approximately five-sixteenths of an inch is sufficient to bring the ends 201 into proper position in receiving groove 252, however further motion is required to permit other operations. The position of the bail 250 in groove 252 is shown in FIG. 23.

The apparatus for turning the ends of the bail 250 is shown in FIGS. 24, 25, 26 and 27. In the present instance crimps 253 and 254 are previously formed in the bail, the crimps being both formed inwardly. The downward travel of the bail 250 is made sufficient so that ends of bail 250 will pass through a turn grip 256 shown on the right side of FIGS. 23, 24 and 25, and a similar turn grip 257 shown on the left side in the same figures.

Turn grip 256 is retained in and is rotatable in a bearing block 258 mounted to an angle 260 which is attached to side frames 50. In a like manner turn grip 257 is retained in a bearing block 262 mounted to the angle 260. Blocks 258 and 262 are supported independently of the plate 54 in order that the plate 54 may move downward bringing bail 250 through the turn grips 256 and 257.

Figure 24:
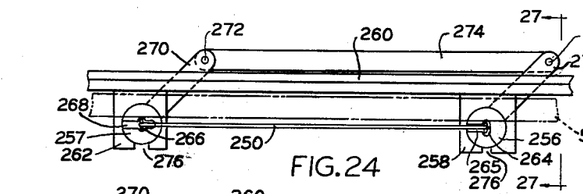
FIG. 24 is a partial top view showing the turning mechanism at the moment of insertion.

Turn grip 256 has an elliptical passageway 264 formed therein, and a slot 265 from the passageway 264 to the outside of the turn grip 256. In a like manner turn grip 257 has an elliptical passageway 266. A slot 268 also extends from the passageway 266 to the outside of turn grip 257, in addition the slot 268 passes through the passageway 266 a distance sufficient to accept the displacement of crimp 254 from the straight portion of bail 250. As shown in FIG. 24 the elliptical passageways 264 and 266 in turn grips 256 and 257 are disposed at right angles to the bail 250 while the slots 265 and 268 are in line with the bail 250. Attached to each turn grip is a lever arm 270. The opposite end of each lever arm 270 has a pin 272 mounted therein. A crosslink 274 is pivotally attached to each lever arm and is arranged to maintain both arms 270 in a parallel position as the bail 250 is inserted.

Figure 25:
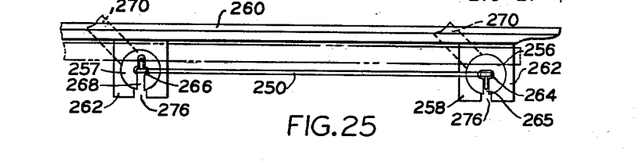
FIG. 25 is a partial top view showing the turning mechanism after the bail ends have been turned.

In FIG. 25 the bail 250 is shown with the elliptical ends 201 turned at right angles to receiving groove 252. To effect this turning, cross-link 274 is moved to the left causing lever arms 270 to move to the position shown (FIG. 25). As the turn grips 256 and 257 rotate approximately ninety degrees the crimps 253 and 254 being engaged in slots 265 and 268 are caused to turn a like amount. To effect a permanent set to the bail 250 in this position (FIG. 25) the turn grips 256 and 257 are rotated about ten degrees past the shown position then returned to the position in FIG. 25. An exit way 276 is provided in each bearing block 262 so that when the bail 250 is released at the same time as the container 65 the now bailed container 65 can move forward for packing and shipping.

Figure 26:
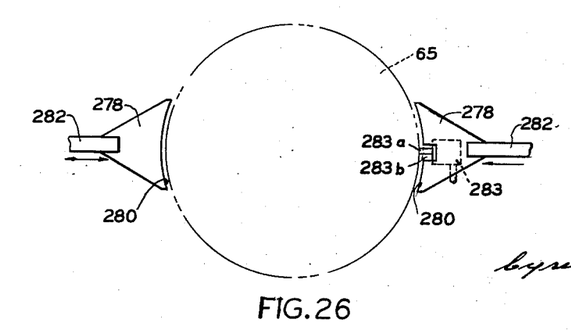
FIG. 26 is a partial top view taken on the line 26—26 of FIG. 23.
Figure 27:
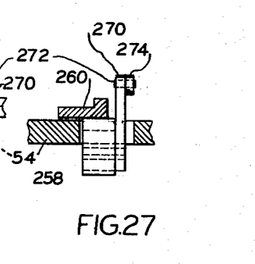
FIG. 27 is a sectional view taken on the line 27—27 of FIG. 24.

In the exemplified apparatus it has been found desirable to hold the container 65 in a fixed relationship to the turn grips 256 and 257. To provide a steady holding means there are arranged a pair of side grips 278 moving in and out in the same plane as the top rim of container 65. In FIG. 26 the side grips 278 are shown in relationship to the container. To hold the container 65 in fixed position the side grips 278 have an arcuate surface 280 formed on their ends. This surface 280 is adapted to engage the corresponding curved surface of the rim of container 65. A shank 282 extends from each grip and is supported and moved in and out by mechanism not shown. To determine the presence of a container 65 before permitting the bail 250 to be inserted, an air switch 283 is mounted on one of the side grips 278. A plunger tip 283a extends from air switch 283 and is disposed in relief 283b in side grip 278. The tip 283a extends beyond the normal arcuate surface 280 and when the side grip 278 moves inward and a container 65 is in place the tip 283a is moved into switch 283 causing an activation of the bail insertion apparatus. If no container is in place the switch 283 will not be activated and the bail 250 will not be brought downward into receiving groove 252 and inserted.

Figure 28:
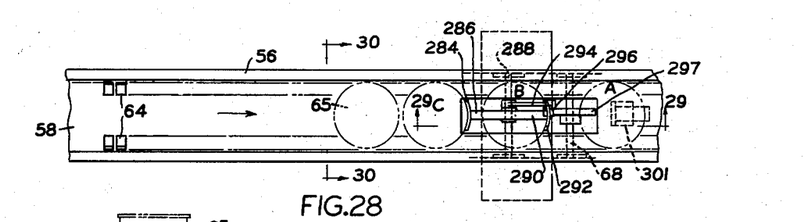
FIG. 28 is a top view showing a partial section of the conveyor and stop mechanism.
Figure 29:
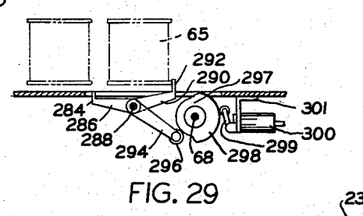
FIG. 29 is a partial sectional view taken on the line 29—29 of FIG. 28.

In the present instance a means of controlling the forward movement of containers 65 is shown in FIGS. 28, 29 and 30. As described above, the channel members 56 are spaced so as to allow roller chains 62, with angle clips 64 attached, to run on sprockets 66. The container 65 is carried on the angle clips 64 and is moved forward until it is stopped by a rear stop lip 284 formed as part of arm 286. Arm 286 is attached to shaft 288 pivotally mounted to channels 54. Also mounted on shaft 288 is an arm 290 to which a front stop lip 292 is formed. Also attached to shaft 288 is a cam arm 294 which has mounted on the other end a cam follower 296. At a selected distance from shaft 288 is a shaft 68 upon which sprockets 66 are mounted. As roller chains 62 proceed, sprockets 66 are caused to rotate and thus shaft 68 to rotate. Mounted on shaft 68 is a cam 297 which has a rise portion 298. As cam 297 rotates the cam follower 296 moves up and down causing shaft 288 to make small angular motions of approximately 20 degrees. When the low portion of the cam 297 is presented to the roller 296 the front stop lip 292 is raised impeding the movement of container 65B at which time the bail 250 is inserted. After insertion the rise portion 298 of the cam is presented causing front stop lip 292 to drop and rear stop lip 284 to rise preventing movement of the succeeding container 65C until the bailed container 65A has moved from position B to position A. Cam 297 also activates the side grip mechanism by means of a contact arm 299 opening air valve 300 mounted on bracket 301 as hereinafter described.

It is apparent from the preceding description that two separate, yet related, operations and apparatus are required in the preferred exemplification shown. In certain circumstances it is contemplated that high speed conveyor lines would have only the inserting apparatus installed thereon. Prior to attaching the bail to the container 65, bails such as bail 250 would be prepared and assembled for high speed dispensing. It is further contemplated that bails 250 could be prepared by moulding, casting, swaging and other commercially inexpensive means. In addition to steel wire, other metallic wire such as aluminum can be used. Certain of the newer mouldable plastics have the physical characteristics necessary to function as a bail as does the wire bail 250. It is thus contemplated that the bail insertion apparatus can be separated and installed on high speed conveyors or filling lines.

Since it is also contemplated that bails 250 may, in many instances, be desired to have no crimps 253 or 254 such as shown in FIG. 23, the inserting apparatus shown in FIGS. 31, 32, 33 and 34 is accordingly adapted for bails either with or without crimps.

In the embodiment shown in FIGS. 31, 32, 33 and 34 a support plate 302 is rigidly mounted to the conveyor, floor or other fixed member used to support the feeding apparatus for containers. A movable plate frame 304 has posts 306 extending upwardly from the frame 304. The posts 306 slide in bushed journals 308 formed in the plate 302. A spring 310 is in compression between bushed journal 308 and a washer 312 held in place by nut 314. Adjacent to the plate 302 and slightly below the plate, a bail 316 without crimps shown in phantom outline is supported on a storage and feed rack 318. This rack in the present instance is composed of three longitudinal slide bars 320 formed on and joining support ribs 322. The bails 316 slide on the bars 320 and are advanced in a predetermined manner and speed so as to present a bail 316 at position S at the precise time it is desired to transfer the bail 316 to the inserting mechanism.

A magnetic bar 324 is attached to a pivot shaft 326 rotatable in a bearing journal 328 in frame 304. Bar 324 moves approximately ninety degrees from a contact location at position S indicated in phantom outline to the engaging position shown at a right angle thereto. To effect this movement of arm 324 there is attached to the upper part of shaft 326 a pivot arm 330. The outer end of this arm is pivotally connected to a rod end 332 attached to rod 334. The other end of rod 334 also has a rod end 335. A cam lever 336 is attached to the rod end 335 and the lever 336 is pivotally mounted on a stud 338. The other end of lever 336 has a cam follower 340 mounted thereon. A cam 342 mounted on a driven shaft 344 engages the cam follower 340 and a lobe 346 on the cam 342 urges the follower 340 outwardly, the arm 336 moving to the position shown in phantom outline in FIG. 31 and in this position the arm 324 is in the position shown in the phantom outline.

Figure 31:
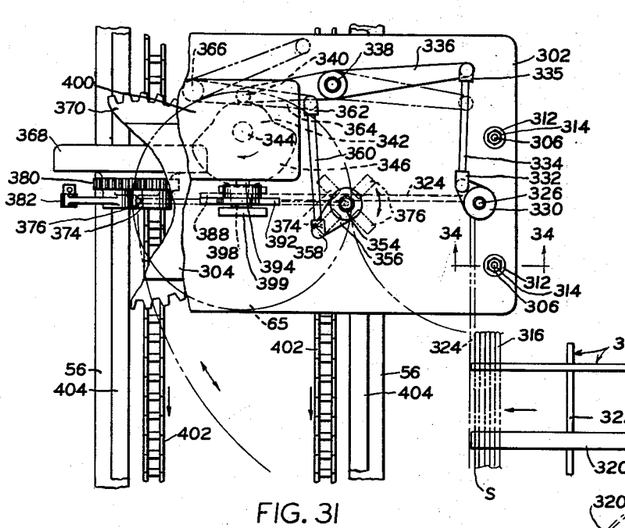
FIG. 31 is a fragmentary top view of an alternate inserting mechanism.

To facilitate compact stacking of the bail 316 for storage and feeding, it has been found most practical to arrange the protuberances on the end of the bail 316, to be formed in the same plane as the bail. It is accordingly necessary to turn the ends of the bail 316 an amount approximately equivalent to a right angle before the ends of the bail can be inserted into the receiving groove 252 (FIG. 23) of the container 65. In the exemplified apparatus a pair of turn clamp assemblies 350 are mounted so that each assembly is axially located and rotatable over an end of the wire bail. In FIG. 31 a part of plate 302 is broken away to expose those elements essential to causing the assemblies to turn in unison and to grip the bail.

Located in bearings 352 mounted in frame 304 are rotatable shafts which are attached to and support the turn clamp assemblies 350. In the present instance the right hand driver, as seen in FIG. 31, has a drive shaft 354 made long enough to extend above plate 302. Attached to the upper end of this shaft 354 is a link arm 356 which is in turn connected to a rod end 358. An arm 360 is fastened to rod end 358 and the other end of arm 360 also has a rod end 362. A cam arm 364 has one end attached to the rod end 362 and the other end is pivotally mounted to frame 304 at stud 366. At a point nearly midway from the ends, the cam arm 364 is attached to cam follower 340. As the cam lobe 346 urges the cam follower 340 away from shaft 344 cam arm 364 will move to the position indicated in phantom outline (FIG. 31) in turn causing link arm 356 to pivot approximately ninety degrees. By using a common cam 342 and cam follower 340 the timed movement of bar 324 and the clamp assemblies 350 is assured.

Figures 32, 33:
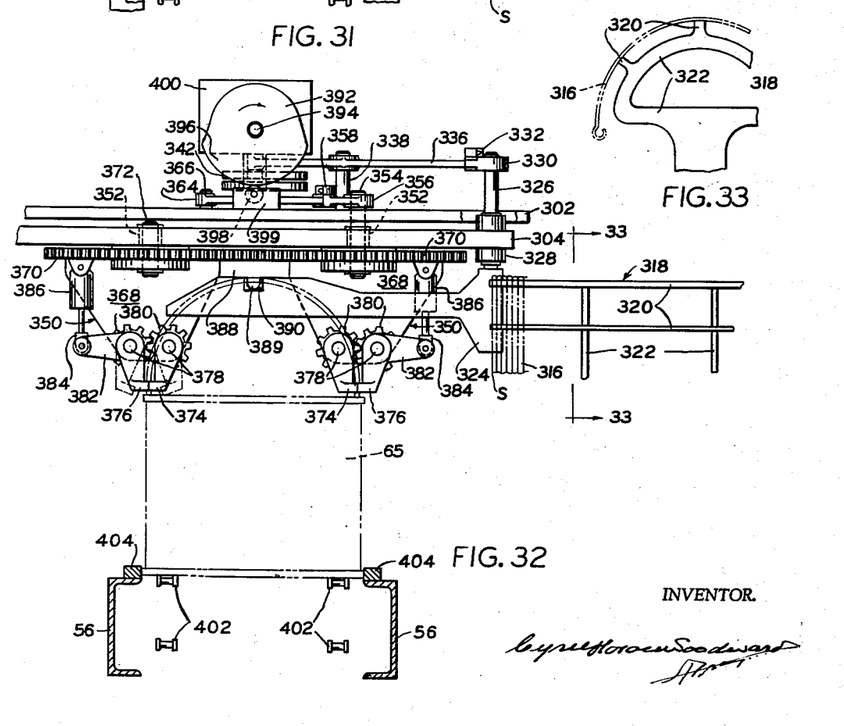
FIG. 32 is a side view of the apparatus shown in FIG. 31.
FIG. 33 is a sectional view taken on the line 33—33 of FIG. 32.
Figure 34:
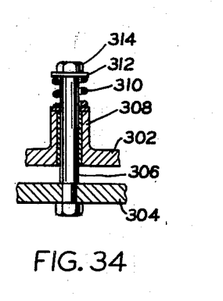
FIG. 34 is a sectional view taken on the line 34—34 of FIG. 31.

Each turn clamp assembly 350 in the present instance comprises a support block 368 which is generally triangularly shaped with the larger portion being adjacent to the frame 304. To each block 368 on the larger end is attached a gear 370. The gears 370 are identical in size and pitch and are selected so that the gears 370 will mesh when the assemblies 350 are operated. As seen in FIG. 32 the driven assembly is the left assembly and is attached pivotally to frame 304 by a stud shaft 372 held in bearing 352 and spaced from drive shaft 354 so that gears 370 will mesh properly. As the driven shaft 354 turns, gears 370 also will turn together causing a corresponding amount of movement in each assembly 350.

To grasp the bail 316 as it is swung into inserting position the present embodiment has a pair of gripper jaws arranged to grasp the bail 316 on each side at a position approximately three-eighths of an inch above the ends. Each pair of gripper jaws has a driven jaw 374 and a driver jaw 376. Each jaw is pivotally mounted on studs 378 extending from support block 368. Each jaw has a gear 380 attached to it, the gears 380 being selected so as to mesh with each other thus enabling driver jaw 376 as it is moved to cause a corresponding movement in driven jaw 374. Extending from driver jaw 376 is a lever element 382 the outer end being pivotally connected to a clevis end 384 of an air cylinder 386.

Between the support blocks 368 as seen in FIG. 32 is a bail gripping finger bar 388 arranged and constructed to move downwardly from frame 304, the end of the bar having a finger 389 with a receiving groove therein arranged to engage the topmost part of the U of the bail 316 and hold it in a fixed position as the magnetic bar 324 moves toward the bail feed rack 318. A relief 390 in bar 324 allows the finger 389 to move into position on the wire without interfering with the movement of bar 324.

To move frame 304 downward a cam 392 mounted on shaft 394 is caused to turn so that lobe 396 will engage a roller 398 mounted in block 399 mounted on frame 304. Housing 400 surrounds the motor and gear train assembly required to turn shafts 344 and 394 at the appropriate speed and relationship to each other.

An alternate embodiment of a container transporting means is shown in FIG. 32 where it is contemplated that the container 65 is carried on a pair of conveying roller chains 402 spaced between side rails 56. As roller chains 402 proceed, sprockets 66 rotate causing shaft 68 to rotate. Container 65 is held in relationship to the side rails 56 by means of guide bars 404 mounted on the top of each rail. The apparatus shown in FIGS. 28 and 29 and heretofore described is also used to space the flow of containers on this exemplification of conveyor means. The cam 297 as it rotates will cause an activation of contact arm 299 which in turn will cause air valve 300 to open and close. By placing the valve 299 opposite the follower 296 the rise portion 298 will urge contact arm 299 so as to cause valve 300 to open. Air so released can be used to feed an air cylinder (not shown) causing a clutch engagement in the drive means operative in housing 400. In a like manner an air cylinder could be either the drive means for operating the inserting apparatus shown in FIGS. 23, 24, 25, 26 and 27, or could control the clutch of the drive mechanism selected to provide the drive to the apparatus previously described.

The apparatus shown in FIGS. 31, 32, 33 and 34 operate in the following manner to insert the bail 316 into the receiving groove 252 of container 65. Cam 342 rotates and lobe 346 engages the follower 340 causing lever 336 to move so that bar 324 moves to engage a bail 316 on rack 318. When the lobe 346 moves away from follower 340 the bail is moved ninety degrees. Meanwhile air cylinders 386 are activated by valve means not shown causing lever element 382 to move toward cylinder 386. This movement opens the jaws 374 and 376 so that the wire ends of bail 316 are able to move into the desired position. After the bail 316 has been moved to the inserting location by bar 324 the air cylinders 386 are activated by valve means not shown so that jaws 374 and 376 close and grasp the wire of bail 316 at a point just above the formed ends. At the same time finger bar 388 moves downward and the finger 389 engages the top part of the bail.

When the cam lobe 346 engages follower 340 the arm 324 moves away and cam arm 364 is moved so that drive shaft 354 is moved about ninety degrees. This movement causes each turn clamp assembly 350 to move ninety degrees which causes a twist to the ends of the bail 316 in a like amount. Cam 392 now moves so that lobe 396 pushes against roller 398 pushing frame 304 downward so that the ends of the bail 316 are caused to enter the receiving groove 252 of container 65. The lobe 346 now moves past follower 340 and the turn clamp assembly 350 moves ninety degrees back to the start position. The bail ends have now been turned in the receiving groove and the bail is installed. Air cylinders 386 are activated to open the jaws 374 and 376 and finger bar 388 is moved upward. The bailed container 65, now released, is moved out of the inserting apparatus meanwhile cam 392 rotates so that lobe 396 moves off roller 398. Springs 310 then urge frame 304 into the start position where the apparatus is in position to once again insert a bail.

When the protuberances on the bail 316 are formed at right angles to the plane of the bail the sequence of operation of the above apparatus is changed. The bail is delivered, grasped, inserted then turned and released.

The clamp assemblies 350 are arranged to be turned ninety degrees after insertion as above but the clamp assemblies 350 are turned back ninety degrees before grasping the next bail. The return turn of ninety degrees can be made either before or after the upward movement of frame 304. The activation of the valve controlling the air cylinders 386 is timed to clamp the bail near its ends after the clamp assembly 350 has returned to the start position, and to release the bail after the turning of the ends of the bail after insertion into the container and before the return ninety degree movement of the clamp assembly 350 to the start position.

Included in the process of making and inserting a bail as described above are the following controlled operations:

(a) move wire from a given supply;
(b) cutting the wire to a precise length;
(c) transfer the wire to end forming means;
(d) successively advance the wire to protuberance forming die means where each end of the wire has predetermined protuberances formed thereon;
(e) transfer the wire to bending means;
(f) bend the wire into U forms.

At this point the bails now so formed may be either stored for future insertion or may be transferred directly to inserting apparatus, and if the latter the following operations are performed:

(g) transfer the bail to inserting means;
(h) move the bail ends into receiving means in the container;
(i) turn the ends of the bail in the receiving means, and
(j) release the bailed container.

If the bails have had the protuberances formed at right angles to the plane of the bail and are stored and assembled so that insertion is to be done at a separate station and/or if a bail that is cast, drawn or otherwise is preformed and made to physically conform to the bail requirements is to be used, the following operations are performed:

(k) transfer the bail from a stack to inserting mechanism;
(l) move the bail ends into receiving means in the container;
(i) turn the ends of the bail in the receiving means, and
(j) release the bailed container.

If the bail has the protuberances arranged in the same plane as the bail and said bails are stored and assembled so that insertion is to be done at a separate station the following operations are performed:

(k) transfer the bail from a stack to inserting mechanism;
(l) grasp the ends of the bail in clamp means;
(m) turn the bail ends so the protuberances thereon are at right angles to the plane of the bail;
(n) move the bail ends into the receiving means in the container;
(m) turn the bail ends in the receiving means so the protuberances thereon are in the same plane as the bail, and;
(o) release the bailed container.

Having thus explained the advantages of my invention and described in detail the particular embodiments and processess selected for illustrative purposes thereof, it will be understood that the invention is not limited to these specific constructional details as illustrated and described, but that modifications may be made without departing from the scope and spirit of the appended claims.

I claim:

1. Apparatus for forming and attaching bails to earless containers, each container having bail-end receiving groove portions formed in the end portion of the rim surrounding the open end of the container, each groove having spaced sidewalls, the apparatus comprising:
 (a) means for cutting a wire to a predetermined length;
 (b) means for forming protuberances in a single plane on each end of the wire, each protuberantly formed end having a length portion greater than the diameter of the wire;
 (c) means for forming the protuberantly ended wire into a U-formed bail with at least one protuberance being disposed with its major axis at substantially right angles to the plane of said bail;
 (d) means for transferring the U-formed bail to the bail end receiving groove portions in the earless containers;
 (e) means to insert the protuberantly formed ends of the U-formed bail into oppositely disposed portions of the bail-end receiving groove portions;
 (f) means for grasping and turning at least one end of the bail end so that the plane of the turned protuberance is disposed to lie in the plane of the bail, the protuberant end so turned engaging the side walls of the groove and upon engagement deforming at least one side wall to form a pivotal-retaining socket for said protuberantly formed bail end; and
 (g) means for releasing the bail-engaged earless container from the apparatus.

2. Apparatus as in claim 1 wherein there is provided a conveyor for the transporting of said earless containers to and through said apparatus and wherein there is provided a stop and holding means arranged to intermittently retain the container in fixed relationship to the apparatus.

3. Apparatus as in claim 2 wherein there is provided means for detecting the presence of earless containers in said holding means.

4. Apparatus as in claim 3 wherein there is provided means for causing an operation of the apparatus in response to the detecting of a container in the holding means.

5. Apparatus for forming and attaching bails to earless containers, each container having bail-end receiving groove portions formed in the end portion of the rim surrounding the open end of the container, each groove having spaced sidewalls, the apparatus comprising:
 (a) means for cutting a precise length of wire from an advancing longer length of wire;
 (b) means for storing and transferring said cut lengths of wire;
 (c) means for forming protuberances in a single plane on each end of the wire, each protuberantly formed end having a length greater than the diameter of the wire;
 (d) means for forming the protuberantly ended wire into a U-formed bail with at least one protuberance being disposed with its major axis at substantially right angles to the plane of said bail;
 (e) means for transferring the U-formed bail to the bail-end receiving groove portions in the earless containers;
 (f) means to insert the protuberantly formed ends of the U-formed bail into oppositely disposed portions of the bail-end receiving groove portions;
 (g) means for grasping and turning at least one end of the bail end so that the plane of the protuberance is disposed to lie in the plane of the bail, the protuberance so turned engaging the side walls of the groove and upon engagement deforming at least one side wall to form a pivotal-retaining socket for the protuberantly formed bail end, and
 (h) means for releasing the bail-engaged earless container from the apparatus.

6. Apparatus as in claim 5 wherein means to form protuberances include end forming die means arranged to successively bend and swage the ends of the wire.

7. Apparatus is in claim 5 wherein means to form protuberances include means to simultaneously form each end of said wire, said means having provision for bending an end portion firstly, at substantially right angles to the axis of the wire bail, thence bending a lesser portion to lie adjacent to and parallel with said first portion and finally bending a smaller third and remaining end portion to lie adjacent to and parallel with said second portion, whereby all bent portions will lie in a common plane and first and third portions will have substantially a common axis.

8. Apparatus for forming wire bails adapted for insertion into bail receiving means in earless containers, comprising;
 (a) a wire feeding means to draw wire from a storage supply,
 (b) means to simultaneously cut an advancing wire at two points to a precisely predetermined length sufficient to make a wire bail,
 (c) means to collect said cut wires and to guide such wires in a single manner,
 (d) means to hold the wire in an intermittently advancing wire retaining means,
 (e) means to operate in successive steps, end forming dies arranged to form the ends into a predetermined protuberant conformation in the same plane,
 (f) means to receive and transfer the said wire from end forming means, and
 (g) means to bend the cut wire into a U-formed bail.

9. Apparatus for installing U-formed wire bails having protuberantly formed ends each end lying in a single plane and having a length along its major axis greater than the diameter of the wire, the bail having at least one end with the protuberance thereon disposed at substantially right angles to the plane of the bail, the bail adapted for installation into an earless container having bail-end receiving portions formed in the end portion of the rim surrounding the open end of the container, the apparatus comprising:
 (a) means for receiving a U-formed bail and transferring said bail into position above the end of the container;
 (b) means for grasping said bail in inserting means;
 (c) means for moving the protuberantly formed ends of the bail into the bail-end receiving portions of the container;
 (d) means for turning the protuberant ends of the bail in said bail-end receiving portions so that the protuberances are in the same plane as the bail; and
 (e) means for releasing the bail from the inserting means.

10. Apparatus as in claim 9 wherein there is provided means to grasp said earless containers in locating means having arcuately formed engaging faces.

11. Apparatus as in claim 10 wherein a container detecting means is arranged to operate in combination with said locating means.

12. Apparatus as in claim 11 wherein said detecting means causes a response and there is provided means for moving said inserting means toward the container in response to the operation of said detecting means.

13. Apparatus as in claim 12 wherein said containers are transported on conveying means and there is provided means to space the cans on the conveying means.

14. Apparatus for installing U-formed wire bails having protuberantly formed ends, each protuberance having a length along its major axis greater than the diameter of the wire, the bail having at least one end with the protuberance thereon disposed at substantially right angles to the plane of the bail, the bail adapted for installation into an earless container having bail-end receiving portions formed in the end portion of the rim surrounding the open end of the container, the apparatus comprising:
 (a) means for receiving a U-formed bail and transferring said bail into position above the end of the container;

(b) means for grasping the bail adjacent each end of the bail;
(c) means for inserting the protuberantly formed bail-ends into oppositely disposed portions of the bail-end receiving portions of the container;
(d) means for turning the ends of the bail so that said protuberances are at right angles to the end receiving portions; and
(e) means for releasing said bail from the apparatus.

15. Apparatus as in claim 14 wherein said containers are transported on conveying means and there is provided means to space said containers for grasping in locating means.

16. Apparatus as in claim 15 wherein a container detecting means is arranged to operate in combination with said locating means and wherein said detecting means causes a response and means for moving said inserting means toward the container in response to the operation of said detecting means.

17. The process of inserting a bail, having ends with protuberances formed thereon, into the top formed bail receiving means of an earless container, comprising:
(a) moving a bail from a storage supply to bail inserting mechanism,
(b) grasping the container in locating means,
(c) inserting the bail ends into the bail receiving means,
(d) turning the ends of the bail so that the protuberances form sockets in the bail receiving means,
(e) releasing the bail from bail inserting mechanism.

18. The process of receiving, transporting and inserting a bail into the top formed bail receiving means of an earless container, comprising:
(a) conveying said earless containers to spacing mechanism,
(b) releasing said containers in spaced relationship,
(c) activating bail making apparatus,
(d) moving a wire from a given supply to cutting means,
(e) cutting the wire to a predetermined precise length,
(f) transferring the cut wire to end forming means,
(g) activating successive die means to form each end of the wire into preselected protuberant forms,
(h) transferring the wire to bending means,
(i) bending the wire into U-shaped forms,
(j) inserting the U-formed bail into the top formed bail receiving means of said earless container.

19. The process of receiving, transporting and inserting a bail as in claim 18 wherein the step of inserting a U-formed bail includes;
(k) activating locating means for holding a container in a desired location under bail applying mechanism,
(l) detecting the presence of a container in said holding means,
(m) causing bail applying apparatus to be activated in response to said detection,
(n) turning the bail ends to a predetermined position,
(o) inserting the bail ends into the bail receiving means,
(p) turning the bail ends to a predetermined position, and
(q) releasing the now bailed container for further transport.

20. Apparatus for installing U-formed wire bails having protuberantly formed ends, each protuberance having a length along its major axis greater than the diameter of the wire, the bail adapted for installation into an earless container having bail-end receiving portions formed in the end portion of the rim surrounding the open end of the container, the apparatus comprising:
(a) means for receiving a U-formed bail and transferring said bail into position above the end of the container;
(b) means for grasping the bail adjacent the ends of the bail;
(c) means for turning the ends of the bail so that said protuberances are aligned with the bail-end receiving portions of the container;
(d) means for inserting the ends of the bail in said bail-end receiving portions;
(e) means for turning the ends of the bail so that the major axis of each protuberance is at right angles to the bail-end receiving portions, and
(f) means for releasing said bailed earless container from the apparatus.

References Cited by the Examiner
UNITED STATES PATENTS

| | | | |
|---|---|---|---|
| 2,268,117 | 12/41 | Gorman | 140—93 |
| 2,272,700 | 2/42 | Gorman | 140—93 |
| 3,078,882 | 2/63 | Simon | 140—93 |

CHARLES W. LANHAM, *Primary Examiner.*